US011435937B2

(12) United States Patent
Esposito et al.

(10) Patent No.: US 11,435,937 B2
(45) Date of Patent: Sep. 6, 2022

(54) MONITORING FOR SERVICE PROCESSORS

(71) Applicant: EMC IP Holding Company LLC, Hopkinton, MA (US)

(72) Inventors: Jeffrey D. Esposito, North Kingstown, RI (US); Michael P. Blanchard, Rochester, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 727 days.

(21) Appl. No.: 16/364,964

(22) Filed: Mar. 26, 2019

(65) Prior Publication Data

US 2020/0310673 A1 Oct. 1, 2020

(51) Int. Cl.
*G06F 3/06* (2006.01)
*H04L 43/04* (2022.01)
*H04L 43/06* (2022.01)

(52) U.S. Cl.
CPC .......... *G06F 3/0653* (2013.01); *G06F 3/0604* (2013.01); *G06F 3/0623* (2013.01); *G06F 3/0673* (2013.01); *H04L 43/04* (2013.01); *H04L 43/06* (2013.01)

(58) Field of Classification Search
None
See application file for complete search history.

(56) References Cited

U.S. PATENT DOCUMENTS

| 9,847,970 | B1* | 12/2017 | Zipperer | H04L 63/1458 |
| 2011/0106978 | A1* | 5/2011 | Shishido | G06F 11/3055 |
| | | | | 710/3 |
| 2016/0042024 | A1* | 2/2016 | Campanotti | G06F 16/2365 |
| | | | | 707/694 |
| 2018/0365422 | A1* | 12/2018 | Callaghan | H04L 63/0442 |

* cited by examiner

*Primary Examiner* — Ernest Unelus
*Assistant Examiner* — Dayton Lewis-Taylor
(74) *Attorney, Agent, or Firm* — Amin, Turocy & Watson, LLP

(57) ABSTRACT

Facilitating monitoring of service processors associated with a data storage system is provided herein. A system can include a monitoring component and an interpretation component. The monitoring component monitors a service processor that controls one or more functions for a data storage system. The monitoring component also generates trend data indicative of trend information for the service processor. The interpretation component performs one or more actions associated with the data storage system in response to a determination that the trend data satisfies a set of defined criteria associated with monitored conditions for the data storage system.

20 Claims, 11 Drawing Sheets

MONITORING FOR SERVICE PROCESSORS

TECHNICAL FIELD

The subject disclosure relates generally to data storage. More specifically, the subject disclosure relates to security threat monitoring for a data storage system.

BACKGROUND

Data storage systems can provide a wide range of storage services. However, data storage systems are often vulnerable to security threats. A service processor can be employed in a data storage system to provide remote management of security threats. However, maintenance of a service processor in a data storage system is generally difficult and/or costly. Maintenance of a service processor in a data storage system also can decrease performance of the data storage system.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, provided herein is a system comprising a memory and a processor. The memory stores computer executable components. The processor executes the computer executable components stored in the memory. Furthermore, the computer executable components comprise a monitoring component and an interpretation component. The monitoring component monitors a service processor that controls one or more functions for a data storage system. The monitoring component also generates trend data indicative of trend information for the service processor. The interpretation component performs one or more actions associated with the data storage system in response to a determination that the trend data satisfies a set of defined criteria associated with monitored conditions for the data storage system.

In certain embodiments, the monitoring component monitors a health state and security efficacy of the service processor. In certain embodiments, the monitoring component generates log data indicative of log information for monitored event contexts associated with the service processor. Furthermore, the interpretation component performs the one or more actions associated with the data storage system based on the trend data and the log data satisfy the defined set of criteria. In certain embodiments, the service processor is a first service processor and the trend data is first trend data. Furthermore, the monitoring component monitors a second service processor associated with the data storage system and generates second trend data indicative of different trend information for the second service processor or one or more other in-network processors. In certain embodiments, the interpretation component performs the one or more actions associated with the data storage system based on the first trend data associated with the first service processor and the second trend data associated with the second service processor or one or more other service processors. In certain embodiments, the monitoring component monitors security mechanism data indicative of one or more security mechanism files associated with the data storage system and generates the trend data based on the security mechanism data.

In another embodiment, provided herein is a method. The method provides for monitoring, by a system comprising a processor, a service processor that controls one or more functions for a data storage system. The method also provides for generating, by the system, profile data, indicative of profile information for the service processor, based on the monitoring the service processor. Furthermore, the method provides for performing, by the system, one or more actions associated with the data storage system based on the profile data.

In certain embodiments, the generating the profile data comprises generating trend data indicative of trend information for the service processor. In certain embodiments, the method provides for performing, by the system, a hash check associated with one or more security mechanism files located in the data storage system. In certain embodiments, the generating the profile data comprises comprise generating the profile data based on the hash check. In certain embodiments, the method provides for monitoring, by the system, network traffic received by the data storage system. In certain embodiments, the generating the profile data comprises generating the profile data based on the network traffic received by the data storage system. In certain embodiments, the method provides for monitoring, by the system, a status of one or more applications associated with the service processor. In certain embodiments, the service processor is a first service processor and the method provides for monitoring, by the system, a second service processor that controls one or more other functions for the data storage system. In certain embodiments, the profile data is first profile data and the method provides for generating, by the system, second profile data indicative of different profile information for the second profile processor. In certain embodiments, the performing the one or more actions comprises performing the one or more actions based on the first profile data for the first service processor and the second profile data for the second service processor.

In yet another embodiment, a computer-readable storage medium comprises instructions that, in response to execution, cause a system comprising a processor to perform operations. The operations comprise monitoring a first service processor that controls a first function for a data storage system. The operations also comprise monitoring a second service processor that controls a second function for the data storage system. Furthermore, the operations comprise generating first profile data indicative of first profile information for the first service processor. The operations also comprise generating second profile data indicative of second profile information for the second service processor. The operations also comprise performing an action associated with the data storage system based on the first profile data and the second profile data.

In certain embodiments, the operations comprise performing a hash check associated with a security mechanism file located in the data storage system. In certain embodiments, the generating the first profile data comprises generating the first profile data based on the hash check. In certain embodiments, the generating the second profile data comprises generating the second profile data based on the hash check. In certain embodiments, the hash check comprises performing a message-digest algorithm or a secure hash algorithm.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
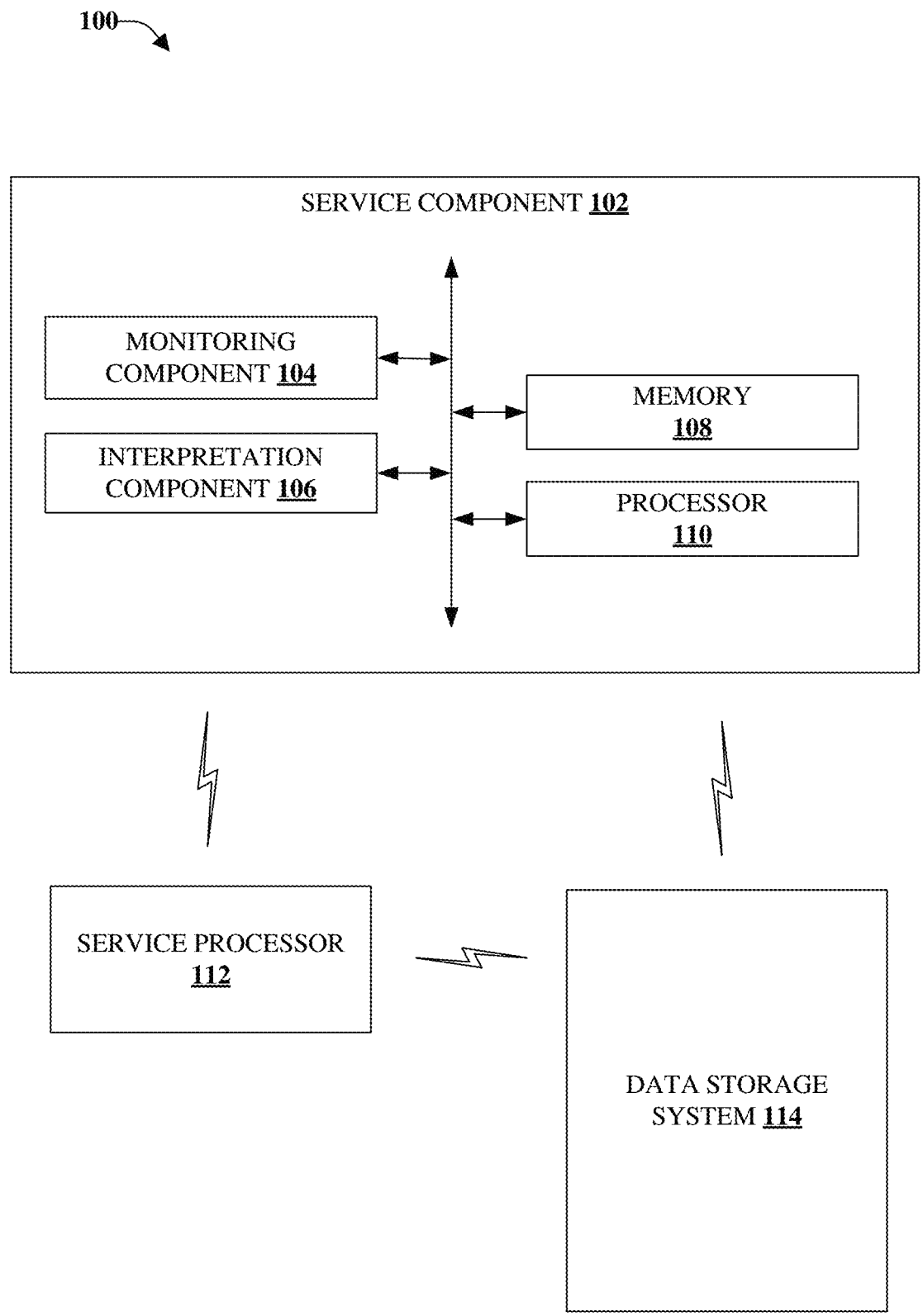
FIG. 1 illustrates an example, non-limiting, system for monitoring service processors associated with a data storage system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Distributed storage systems and/or other data storage systems can provide a wide range of storage services. However, distributed storage systems and/or other data storage systems are often vulnerable to security threats. A service processor can be employed in a distributed storage system and/or another data storage system to provide remote management of security threats. However, maintenance of a service processor in a distributed storage system and/or another data storage system is generally difficult and/or costly. Maintenance of a service processor in a distributed storage system and/or another data storage system also can decrease performance of the distributed storage system and/or the other data storage system.

To address issues mentioned above with respect to conventional data storage systems and/or other issues, one or more embodiments of the present disclosure provide monitoring for service processors associated with a data storage system. For instance, intelligent, interpretive, and/or lightweight monitoring of security threats for a data storage system can be provided. Additionally or alternatively, controlled, proactive and/or reactive behaviors in response to a security threat for a data storage system can be provided. A security threat for a data storage system can be a security intrusion attempt related to the data storage system, a viral event related to the data storage system, an unapproved executable event related to the data storage system, and/or another security threat related to the data storage system. The monitoring of a service processor as disclosed herein can interpret security threat contexts for proactive and reactive responses to the security threat. For instance, one or more actions associated with a data storage system can be performed as a proactive response and/or a reactive response to a potential security threat. In an embodiment, a monitoring engine for a service processor can behave as an agent factory and/or a threat monitor context interpreter. The agent factory and/or the threat monitor context interpreter can behave independently and/or in combination with one or more other service processors (e.g., one or more other in-network service processors). Adaptive behavior of the monitoring engine, both proactive and reactive, can be improved over time based on time in service, collected trend data collected, and/or other data. In certain embodiments, a hashing algorithm can be employed to facilitate monitoring for service processors associated with a data storage system. In certain embodiments, a service processor can undergo a controlled restart (e.g., rather than a reimaging process) based on monitoring of the service processor. As such, a number of security threats for a data storage system can be reduced. Additionally or alternatively, impact of security threats on a data storage system can be reduced. Expense of anti-viral patching and/or operating system patching for a service processor can also be reduced. Moreover, improved performance for a data storage system and/or a service processor can be provided.

FIG. 1 illustrates an example, non-limiting, system 100 for monitoring service processors associated with a data storage system in accordance with one or more embodiments described herein. In an embodiment, the system 100 (as well as other systems discussed herein) can be implemented in a data storage system (e.g., a distributed data storage system, a cloud data storage system, etc.). The system 100 can additionally or alternatively be employed by various systems, such as, but not limited to data storage systems, distributed data storage systems, cloud data storage systems, storage array systems, flash storage systems, data protection systems, data analytics systems, networking systems, internet technology systems, service processor systems, processor systems, server systems, cloud-based systems, cloud computing systems, virtual machine systems, high-performance computing systems, enterprise systems, artificial intelligence systems, machine learning systems, neural network systems, data intelligence systems, and the like. Moreover, the system 100 and/or the components of the system 100 can be employed to use hardware and/or software to solve problems that are highly technical in nature (e.g., related to distributed data storage, related to processing digital data, related to artificial intelligence, etc.), that are not abstract and that cannot be performed as a set of mental acts by a human.

The system 100 can include a service component 102 that can include a monitoring component 104 and an interpretation component 106. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the service component 102) can include memory 108 for storing computer executable components and instructions. The system 100 (e.g., the service component 102) can further include a processor 110 to facilitate operation of the instructions (e.g., computer executable components and instructions) by the system 100 (e.g., the service component 102).

The monitoring component 104 of the service component 102 can monitor a service processor 112. For example, the monitoring component 104 of the service component 102 can monitor a health state and/or security efficacy of the service processor 112. A health state of the service processor 112 can be a health status of the service processor 112. In one example, a health state of the service processor 112 can include one or more diagnostics associated with performance of the service processor 112 (e.g., performance of one or more hardware components and/or one or more software components of the service processor 112). Security efficacy of the service processor 112 can be a measure of an ability for the service processor 112 to handle and/or manage a security threat. The service processor 112 can be a processor that manages and/or controls one or more functions, one or more services, one or more processes, and/or one or more activities for a data storage system 114. For instance, the service processor 112 can remotely monitor, manage and/or modify one or more portions of the data storage system 114. In an embodiment, the service component 102 can be implemented separate from the service processor 112. In another embodiment, the service processor 112 can include the service component 102. Additionally, the service component 102, the service processor 112 and/or the data storage system 114 can be communicatively coupled. The data storage system 114 can include hardware and/or software to store data. For instance, the data storage system 114 can include a set of processor cores, a set of memory cores, and/or memory system software to facilitate storage of data. In certain embodiments, the service processor 112 can interact with one or more storage devices of the data storage system 114. In an example, the data storage system 114 can be a distributed data storage system (e.g., the one or more storage devices can be geographically distributed devices). For example, a first data storage device of the data storage system 114 can be located in a first geographical location and a second data storage device of the data storage system 114 can be located in a second geographical location. Furthermore, in an embodiment, the data storage system 114 can include an array of flash memory to facilitate storage of data. As used herein, the term "storage device," "first storage device," "data storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data. The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users. Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices.

In an aspect, the monitoring component 104 can generate trend data associated with the service processor 112. The trend data generated by the monitoring component 104 can include, for example, trend information for the service processor 112. For instance, the trend data generated by the monitoring component 104 can include information regarding one or more trends associated with the service processor 112, one or more events associated with the service processor 112, and/or one or more monitored conditions associated with the service processor 112. In an embodiment, the monitoring component 104 can monitor security mechanism data indicative of one or more security mechanism files located in the data storage system 114. Furthermore, the monitoring component 104 can generate the trend data based on the security mechanism data. In certain embodiments, the monitoring component 104 can generate profile data for the service processor 112 that includes the trend data. In an example, the profile data for the service processor 112 can include information such as, but not limited to, information related to security mechanism files located in the data storage system 114, information related to a health of the service processor 112, information related to one or more applications executed by the service processor 112, information related to a state of a process associated with the service processor 112, and/or other information related to the service processor 112. Additionally or alternatively, the monitoring component 104 can generate log data indicative of log information for monitored event contexts associated with the service processor 112. The log data can include, for example, event logs, statistics and/or metrics associated with the service processor 112. In another embodiment, the monitoring component 104 can perform a hash check associated with the one or more security mechanism files located in the data storage system 114. For example, the monitoring component 104 can perform a message-digest algorithm (MD5) associated with a particular hash function (e.g., a 128-bit hash value) to verify data integrity of the one or more security mechanism files located in the data storage system 114. In another example, the monitoring component 104 can perform a secure hash algorithm (SHA) associated with a cryptographic hash function to verify data integrity of the one or more security mechanism files located in the data storage system 114. However, it is to be appreciated that the monitoring component 104 can employ another type of hash check to analyze the one or more security mechanism files located in the data storage system 114. Furthermore, the monitoring component 104 can generate the trend data (e.g., the trend data in the profile data) based on the hash check. In yet another embodiment, the monitoring component 104 can monitor network traffic received by the data storage system 114. For example, the monitoring component 104 can determine whether network traffic is received by a blocked port (e.g., a firewall blocked port) of the data storage system 114. In another example, the monitoring component 104 can determine whether network traffic received by the data storage system 114 satisfies a defined criterion associated with a network traffic threshold level. The monitoring component 104 can also generate the trend data (e.g., the trend data in the profile data) based on analysis of the network traffic received by the data storage system 114. In yet another embodiment, the monitoring component 104 can monitor a running status of one or more applications executed by the service processor 112 and/or the data storage system 116. The monitoring component 104 can also generate the trend data (e.g., the trend data in the profile data) based on the status of the one or more applications executed by the service processor 112 and/or the data storage system 116. In certain embodiments, the monitoring component 104 can repeatedly monitor the service processor 112 by repeatedly comparing the profile data for the service processor 112 against one or more service processor threshold levels. In certain embodiments, the monitoring component 104 can determine one or more monitor context ratings for the service processor 112 based on the profile data. In certain embodiments, the monitoring component 104 can additionally or alternatively monitor previously generated trend data associated with the service processor 112 and/or the data storage system 114.

In certain embodiments, the monitoring component 104 can perform a machine learning process (e.g., an artificial intelligence process for machine learning) to generate the trend data and/or the log data associated with the service processor 112. In an aspect, the monitoring component 104 can perform deep learning to facilitate determination of one or more trends, one or more statistics, one or more classifications, one or more inferences, and/or one or more predictions associated with the service processor 112. For instance, the monitoring component 104 can extract information that is indicative of trends, correlations, inferences, statistics and/or expressions from data associated with the service processor 112. In an aspect, the monitoring component 104 can perform learning with respect to data associated with the service processor 112. The monitoring component 104 can also employ an automatic classification system and/or an automatic classification process to facilitate analysis of the service processor 112. For example, the monitoring component 104 can employ a probabilistic and/or statistical-based analysis (e.g., factoring into the analysis utilities and costs) to learn and/or generate inferences with respect to the service processor 112. The monitoring component 104 can employ, for example, a support vector machine (SVM) classifier to learn and/or generate inferences associated with the service processor 112. Additionally or alternatively, the monitoring component 104 can employ other classification techniques associated with Bayesian networks, decision trees and/or probabilistic classification models. Classifiers employed by the monitoring component 104 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class—that is, f(x)=confidence(class).

The monitoring component 104 can additionally or alternatively employ any suitable machine-learning based techniques, statistical-based techniques and/or probabilistic-based techniques. For example, the monitoring component 104 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the monitoring component 104 can perform a set of machine learning computations associated with learning one or more trends and/or information related to the service processor 112. For example, the monitoring component 104 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more trends and/or information related to the service processor 112.

The interpretation component 106 can perform one or more actions associated with the data storage system 114. For instance, the interpretation component 106 can perform one or more actions associated with the data storage system 114 in response to a determination that the trend data and/or the profile data satisfies a set of defined criteria associated with the data storage system 114. In one example, the interpretation component 106 can perform one or more actions associated with the data storage system 114 in response to a determination that the trend data satisfies a set of defined criteria associated with monitored conditions for the data storage system 114. The one or more actions associated with the data storage system 114 can be one or more actions to modify one or more portions of the data storage system 114. The one or more actions associated with the data storage system 114 can also be performed to mitigate a security threat for the data storage system 114. A security threat for the data storage system 114 can be a security intrusion attempt related to the data storage system 114, a viral event related to the data storage system 114, an unapproved executable event related to the data storage system 114, and/or another security threat related to the data storage system 114. In certain embodiments, the interpretation component 106 can perform the one or more actions associated with the data storage system based on the profile data, trend data and/or the log data. In certain embodiments, the interpretation component 106 can execute a recheck of one or more conditions of the service processor 112 and/or the data storage system 114 based on the profile data, trend data and/or the log data. In one example, the interpretation component 106 can execute a recheck of one or more conditions of the service processor 112 and/or the data storage system 114 in response to a determination that a certain interval of time has passed since a previous check of the one or more conditions of the service processor 112 and/or the data storage system 114. In certain embodiments, the interpretation component 106 can restart the service processor 112 based on the profile data, trend data and/or the log data. In certain embodiments, the interpretation component 106 can request that a different service processor check one or more conditions for the service processor 112 and/or the data storage system 114 based on the profile data, trend data and/or the log data. As such, the monitoring component 104 in combination with the interpretation component 106 can provide intelligent, interpretive, adaptive, and/or lightweight monitoring of security threats for the data storage system 114. Additionally or alternatively, the monitoring component 104 in combination with the interpretation component 106 can provide controlled, proactive and/or reactive behaviors associated with the service processor 112 and/or the data storage system 114 in response to a security threat for the data storage system 114. The monitoring component 104 in combination with the interpretation component 106 can also interpret security threat contexts for proactive and reactive responses to the security threat. For instance, the one or more actions associated with the data storage system 114 can be performed as a proactive response and/or a reactive response to a potential security threat for the data storage system 114.

It is to be appreciated that technical features of the service component 102 are highly technical in nature and not abstract ideas. Processing threads of the service component 102 that monitor data, process data, analyze data, perform one or more machine learning processes, etc. cannot be performed by a human (e.g., are greater than the capability of a single human mind). For example, an amount of data processed, a speed of processing of data, and/or data types of data processed by the service component 102 over a certain period of time can be respectively greater, faster and different than the amount, speed and data type that can be processed by a single human mind over the same period of time. Furthermore, data processed by the service component 102 can be digital data generated by one or more computing devices. Moreover, the service component 102 can be fully operational towards performing one or more other functions (e.g., fully powered on, fully executed, etc.) while also processing data.

Figure 2:
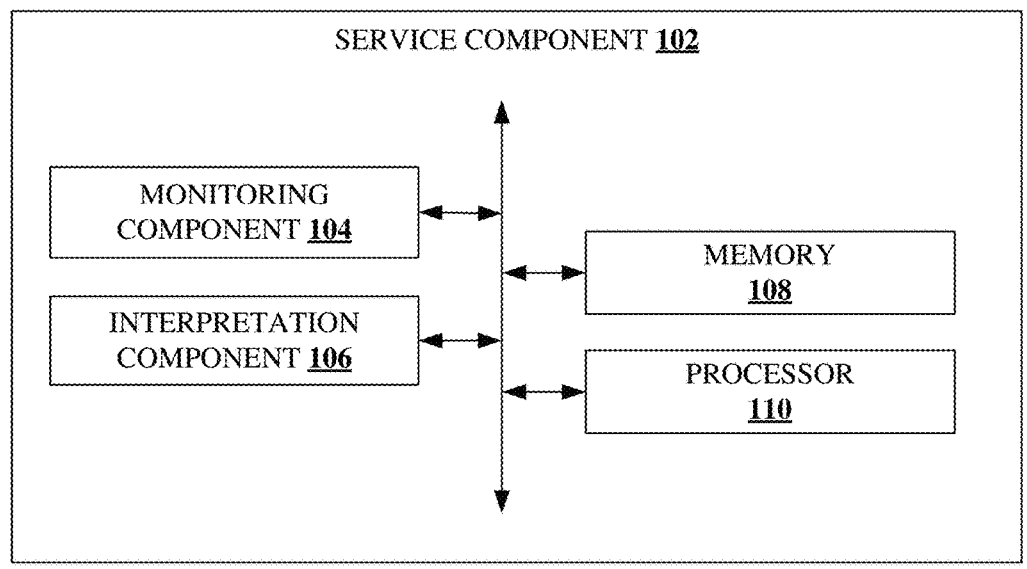
FIG. 2 illustrates another example, non-limiting, system for monitoring service processors associated with a data storage system in accordance with one or more embodiments described herein.
Figure 2:
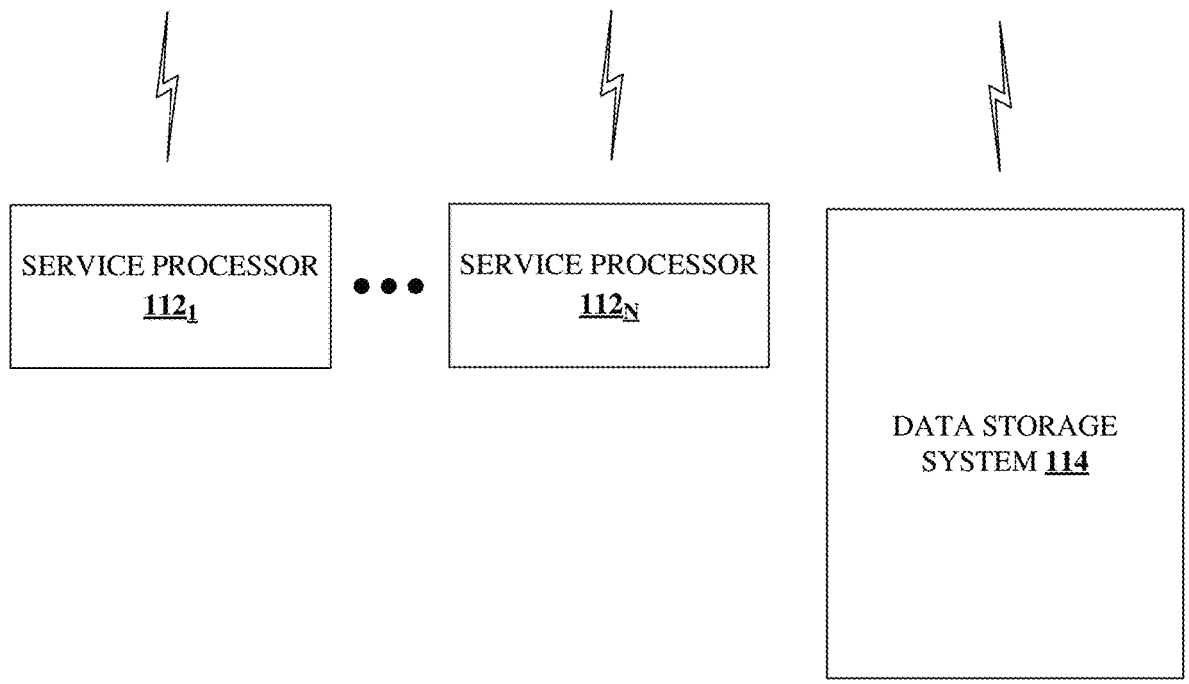

Referring now to FIG. 2, there is illustrated a non-limiting implementation of a system 200 in accordance with various aspects and implementations of this disclosure. Repetitive description of like elements employed in other embodiments described herein is omitted for sake of brevity. The system 200 can include the service component 102, the data storage system 114, and/or one or more service processors $112_{1-N}$, where N is an integer. In an embodiment, the service processor 112 can be a service processor from the one or more service processors $112_{1-N}$. The service component 102, the data storage system 114, and/or one or more service processors $112_{1-N}$ can be communicatively coupled. In certain embodiments, the system 200 can additionally or alternatively include one or more other types of processors (e.g., one or more other in-network processors, etc.).

The monitoring component 104 of the service component 102 can monitor a service processor $112_1$. For example, the monitoring component 104 of the service component 102 can monitor a health state and/or security efficacy of the service processor $112_1$. A health state of the service processor $112_1$ can be a health status of the service processor $112_1$. In one example, a health state of the service processor $112_1$ can include one or more diagnostics associated with performance of the service processor $112_1$ (e.g., performance of one or more hardware components and/or one or more software components of the service processor $112_1$). Security efficacy of the service processor $112_1$ can be a measure of an ability for the service processor $112_1$ to handle and/or manage a security threat. In an embodiment, the monitoring component 104 can monitor the service processor $112_1$ to generate first trend data associated with the service processor $112_1$. The first trend data generated by the monitoring component 104 can include, for example, first trend information for the service processor $112_1$. For instance, the first trend data generated by the monitoring component 104 can include information regarding one or more trends associated with the service processor $112_1$, one or more events associated with the service processor $112_1$, and/or one or more monitored conditions associated with the service processor $112_1$. In an embodiment, the monitoring component 104 can monitor security mechanism data indicative of one or more security mechanism files located in the data storage system 114. Furthermore, the monitoring component 104 can generate the first trend data based on the security mechanism data. In certain embodiments, the monitoring component 104 can generate first profile data for the service processor $112_1$ that includes the first trend data. In an example, the first profile data for the service processor $112_1$ can include information such as, but not limited to, information related to security mechanism files located in the data storage system 114, information related to a health of the service processor $112_1$, information related to one or more applications executed by the service processor $112_1$, information related to a state of a process associated with the service processor $112_1$, and/or other information related to the service processor $112_1$. Additionally or alternatively, the monitoring component 104 can generate first log data indicative of first log information for monitored event contexts associated with the service processor $112_1$. The first log data can include, for example, event logs, statistics and/or metrics associated with the service processor $112_1$. The monitoring component 104 can also generate the first trend data (e.g., the first trend data in the first profile data) based on analysis of the network traffic received by the data storage system 114. In yet another embodiment, the monitoring component 104 can monitor a running status of one or more applications executed by the service processor $112_1$. The monitoring component 104 can also generate the first trend data (e.g., the first trend data in the first profile data) based on the status of the one or more applications executed by the service processor $112_1$. In certain embodiments, the monitoring component 104 can repeatedly monitor the service processor $112_1$ by repeatedly comparing the profile data for the service processor $112_1$ against one or more service processor threshold levels. In certain embodiments, the monitoring component 104 can determine one or more monitor context ratings for the service processor $112_1$ based on the first profile data. In certain embodiments, the monitoring component 104 can additionally or alternatively monitor previously generated trend data associated with the service processor $112_1$ and/or the data storage system 114.

Furthermore, the monitoring component 104 of the service component 102 can monitor a service processor $112_N$. For example, the monitoring component 104 of the service component 102 can monitor a health state and/or security efficacy of the service processor $112_N$. A health state of the service processor $112_N$ can be a health status of the service processor $112_N$. In one example, a health state of the service processor $112_N$ can include one or more diagnostics associated with performance of the service processor $112_N$ (e.g., performance of one or more hardware components and/or one or more software components of the service processor $112_N$). Security efficacy of the service processor $112_N$ can be a measure of an ability for the service processor $112_N$ to handle and/or manage a security threat. In an embodiment, the monitoring component 104 can monitor the service processor $112_N$ to generate second trend data associated with the service processor $112_N$. The second trend data generated by the monitoring component 104 can include, for example, second trend information for the service processor $112_N$. For instance, the second trend data generated by the monitoring component 104 can include information regarding one or more trends associated with the service processor $112_N$, one or more events associated with the service processor $112_N$, and/or one or more monitored conditions associated with the service processor $112_N$. In an embodiment, the monitoring component 104 can monitor security mechanism data indicative of one or more security mechanism files located in the data storage system 114. Furthermore, the monitoring component 104 can generate the second trend data based on the security mechanism data. In certain embodiments, the monitoring component 104 can generate second profile data for the service processor $112_N$ that includes the second trend data. In an example, the second profile data for the service processor $112_N$ can include information such as, but not limited to, information related to security mechanism files located in the data storage system 114, information related to a health of the service processor $112_N$, information related to one or more applications executed by the service processor $112_N$, information related to a state of a process associated with the service processor $112_N$, and/or other information related to the service processor $112_N$. Additionally or alternatively, the monitoring component 104 can generate second log data indicative of second log information for monitored event contexts associated with the service processor $112_N$. The second log data can include, for example, event logs, statistics and/or metrics associated with the service processor $112_N$. The monitoring component 104 can also generate the second trend data (e.g., the second trend data in the second profile data) based on analysis of the network traffic received by the data storage system 114. In yet another embodiment, the monitoring component 104 can monitor a running status of one or more applications executed by the service processor $112_N$. The monitoring component 104 can also generate the second trend data (e.g., the second trend data in the second profile data) based on the status of the one or more applications executed by the service processor $112_N$. In certain embodiments, the monitoring component 104 can repeatedly monitor the service processor $112_N$ by repeatedly comparing the profile data for the service processor $112_N$ against one or more service processor threshold levels. In certain embodiments, the monitoring component 104 can determine one or more monitor context ratings for the service processor $112_N$ based on the second profile data. In certain embodiments, the monitoring component 104 can additionally or alternatively monitor previously generated trend data associated with the service processor $112_2$ and/or the data storage system 114.

The interpretation component 106 can perform one or more actions associated with the data storage system 114 based on the first trend data associated with the service processor $112_1$ and the second trend data associated with the service processor $112_N$. For instance, the interpretation component 106 can perform one or more actions associated with the data storage system 114 in response to a determination that the first trend data, the first profile data, the second trend data and/or the second data satisfies a set of defined criteria associated with the data storage system 114. In one example, the interpretation component 106 can perform one or more actions associated with the data storage system 114 in response to a determination that the first trend data, the first profile data, the second trend data and/or the second data satisfies a set of defined criteria associated with monitored conditions for the data storage system 114. The one or more actions associated with the data storage system 114 can be one or more actions to modify one or more portions of the data storage system 114. The one or more actions associated with the data storage system 114 can also be performed to mitigate a security threat for the data storage system 114. A security threat for the data storage system 114 can be a security intrusion attempt related to the data storage system 114, a viral event related to the data storage system 114, an unapproved executable event related to the data storage system 114, and/or another security threat related to the data storage system 114. In certain embodiments, the interpretation component 106 can perform the one or more actions associated with the data storage system based on the first trend data, the first profile data, the first log data, the second trend data, the second data and/or the second log data. In certain embodiments, the interpretation component 106 can execute a recheck of one or more conditions of the service processor $112_1$ and/or the service processor $112_N$ based on the first trend data, the first profile data, the first log data, the second trend data, the second data and/or the second log data. In one example, the interpretation component 106 can execute a recheck of one or more conditions of the service processor $112_1$ and/or the service processor $112_N$ in response to a determination that a certain interval of time has passed since a previous check of the one or more conditions of the service processor $112_1$ and/or the service processor $112_N$. In certain embodiments, the interpretation component 106 can restart the service processor $112_1$ and/or the service processor $112_N$ based on the first trend data, the first profile data, the first log data, the second trend data, the second data and/or the second log data. In certain embodiments, the interpretation component 106 can request that a different service processor check one or more conditions for the service processor $112_1$ and/or the service processor $112_N$ based on the first trend data, the first profile data, the first log data, the second trend data, the second data and/or the second log data. For example, the interpretation component 106 can request that the service processor $112_1$ check one or more conditions for the service processor $112_N$ based on the first trend data, the first profile data, the first log data, the second trend data, the second data and/or the second log data. In another example, the interpretation component 106 can request that the service processor $112_N$ check one or more conditions for the service processor $112_1$ based on the first trend data, the first profile data, the first log data, the second trend data, the second data and/or the second log data. As such, the monitoring component 104 in combination with the interpretation component 106 can provide intelligent, interpretive, and/or lightweight monitoring of security threats for the data storage system 114. Additionally or alternatively, the monitoring component 104 in combination with the interpretation component 106 can provide controlled, proactive and/or reactive behaviors associated with the service processor $112_1$ and/or the service processor $112_N$ in response to a security threat for the data storage system 114. The monitoring component 104 in combination with the interpretation component 106 can also interpret security threat contexts for proactive and reactive responses to the security threat. For instance, the one or more actions associated with the data storage system 114 can be performed as a proactive response and/or a reactive response to a potential security threat for the data storage system 114.

Figure 3:
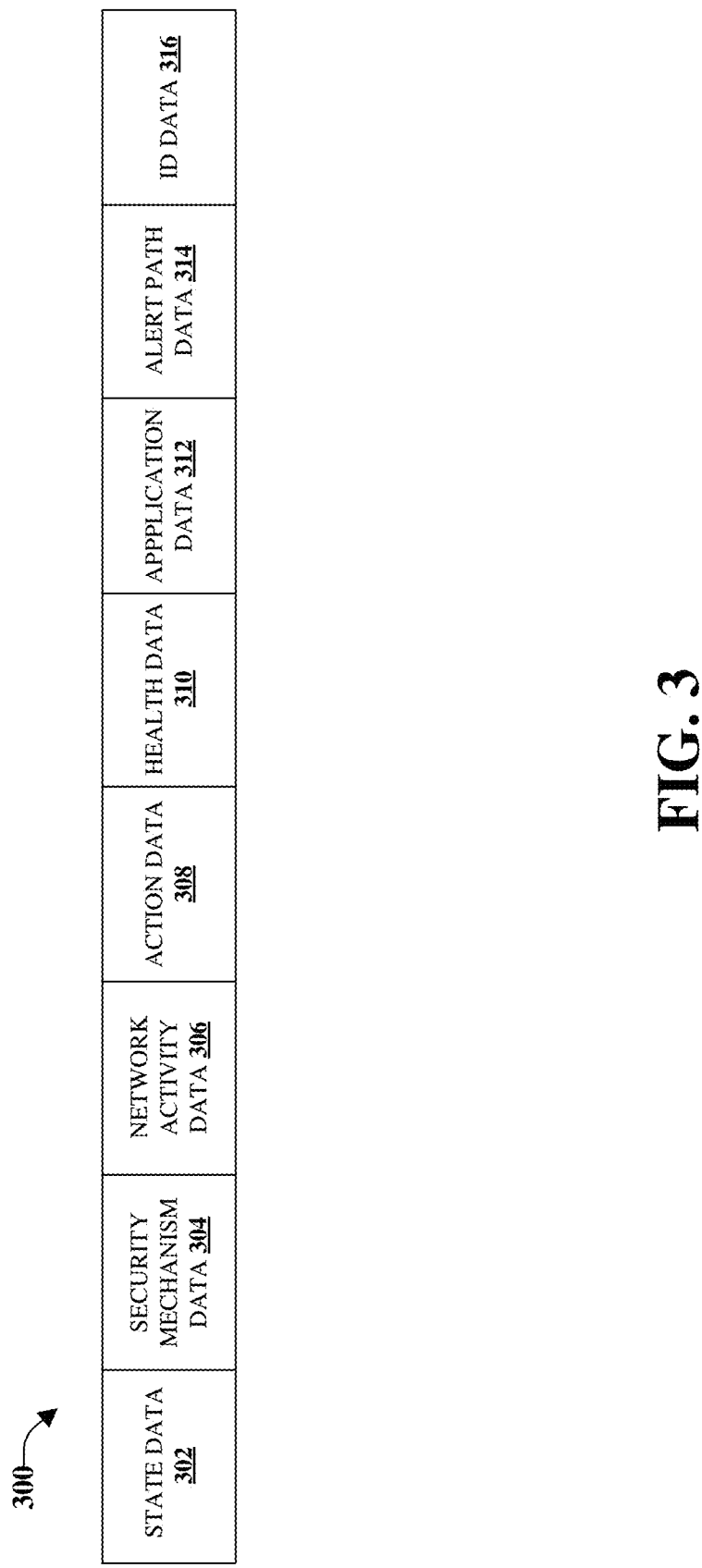
FIG. 3 illustrates example, non-limiting profile data in accordance with one or more embodiments described herein.

Referring now to FIG. 3, there is illustrated a non-limiting implementation of profile data 300 in accordance with various aspects and implementations of this disclosure. Repetitive description of like elements employed in other embodiments described herein is omitted for sake of brevity. The profile data 300 can include profile information for one or more service processors. For example, the profile data 300 can include profile information for the service processor 112. In another example, the profile data 300 can include profile information for one or more service processors from the one or more service processors $112_{1-N}$. Additionally, the profile data 300 can be generated by the monitoring component 104, for example, to facilitate performing one or more actions associated with a data storage system (e.g., the data storage system 114). In an aspect, the profile data 300 can provide trend data indicative of trend information for a service processor and/or a data storage system. In an embodiment, the profile data 300 can include state data 302, security mechanism data 304, network activity data 306, action data 308, health data 310, application data 312, alert path data 314 and/or ID data 316. The state data 302 can provide information regarding a state of a service processor. The state of the service processor can be a synchronization state, a service state, a processing state, a power state, a memory state, and/or another type of state associated with the service processor. The security mechanism data 304 can include information regarding one or more security mechanism files located in a data storage system. For example, the one or more security mechanism files can be located at one or more locations throughout the data storage system. In one example, the one or more security mechanism files can be one or more fake files (e.g., one or more honey files) employed to detect a security threat for the data storage system. The network activity data 306 can include information regarding network activity associated with a service processor and/or a data storage system. For instance, the network activity data 306 can include information associated with monitored network traffic (e.g., network traffic received by a service processor and/or a data storage system). In one example, the network activity data 306 can include information regarding one or more network activity triggers associated with a service processor and/or a data storage system. The action data 308 can include information regarding one or more actions executed by a service processor and/or a data storage system. In one example, the action data 308 can include information regarding one or more actions associated with one or more ports of a data storage system. The health data 310 can include information regarding a health status (e.g., a health state) of a service processor and/or a data storage system. For instance, the health data 310 can include information regarding one or more diagnostics associated with performance of a service processor and/or a data storage system. In one example, the health data 310 can information regarding performance of one or more hardware components of a service processor and/or a data storage system. The application data 312 can include information regarding a status of one or more applications associated with a service processor and/or a data storage system. For instance, the application data 312 can include information whether one or more applications are disabled, whether one or more applications are downloaded, whether one or more applications are inactive, etc. The alert path data 314 can include information regarding one or more alerts generated by a service processor and/or a data storage system. For instance, the alert path data 314 can include information regarding a type of alert and/or a path of transmission for an alert. The ID data 316 can include information regarding an identification (e.g., an identifier) for a service processor and/or a data storage system.

Figure 4:
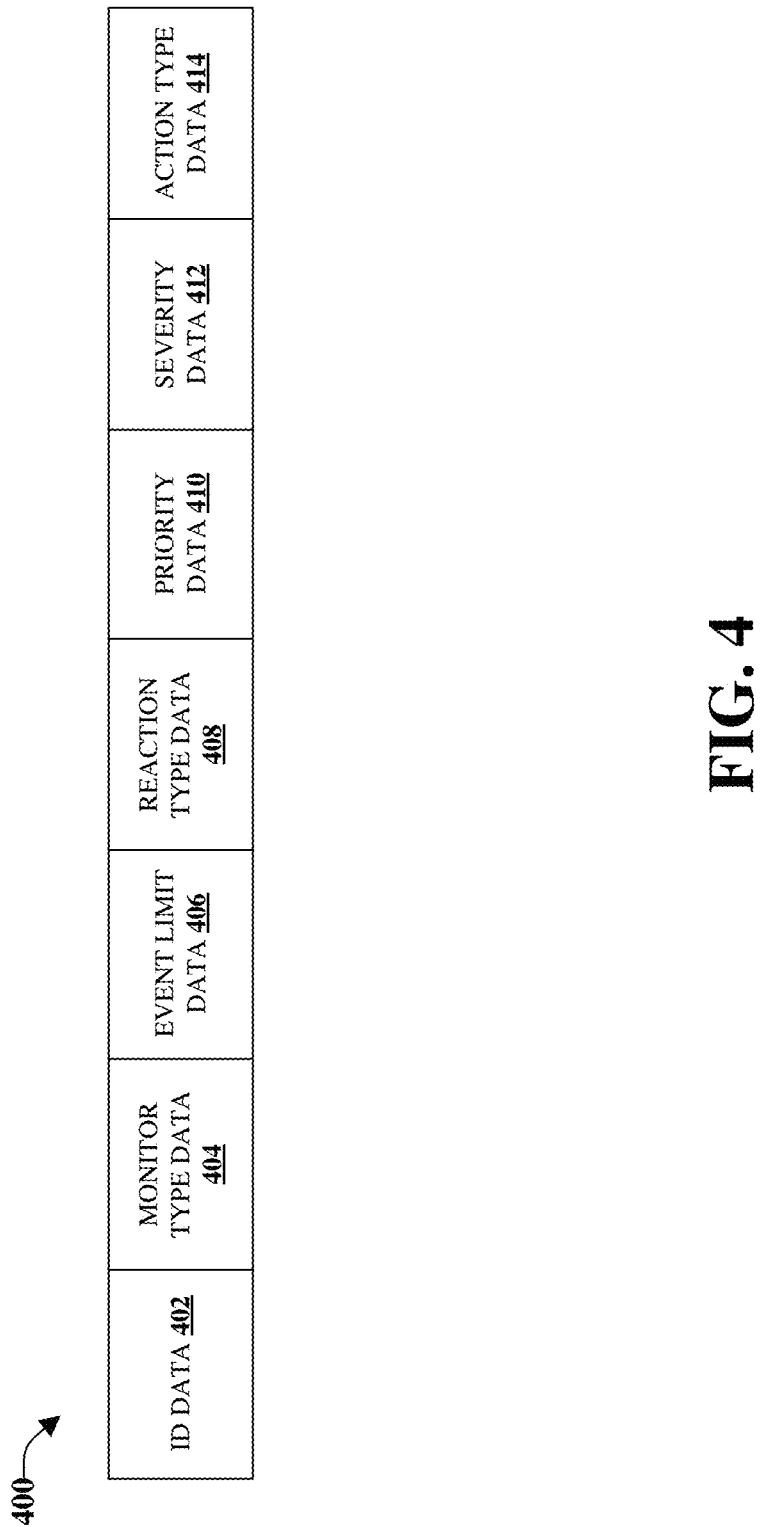
FIG. 4 illustrates example, non-limiting detail data in accordance with one or more embodiments described herein.

Referring now to FIG. 4, there is illustrated a non-limiting implementation of detail data 400 in accordance with various aspects and implementations of this disclosure. Repetitive description of like elements employed in other embodiments described herein is omitted for sake of brevity. The detail data 400 can include detail information for one or more service processors. For example, the detail data 400 can include detail information for the service processor 112. In another example, the detail data 400 can include detail information for one or more service processors from the one or more service processors $112_{1-N}$. Additionally, the detail data 400 can be generated by the monitoring component 104, for example, to facilitate performing one or more actions associated with a data storage system (e.g., the data storage system 114). In an aspect, the detail data 400 can provide context data indicative of context for trend information associated with a service processor and/or a data storage system. In certain embodiments, the detail data 400 can be employed in combination with the profile data 300 to facilitate performing one or more actions associated with a data storage system (e.g., the data storage system 114). In an embodiment, the detail data 400 can include ID data 402, monitor type data 404, event limit data 406, reaction type data 408, severity data 412 and/or action type data 414. The ID data 402 can include information regarding an identification (e.g., an identifier) for a service processor and/or a data storage system. The monitor type data 404 can include information regarding a type of monitoring performed by the monitoring component 104. The event limit data 406 can include information regarding one or more threshold limits to facilitate identifying one or more events associated with a service processor and/or a data storage system. The reaction type data 408 can include information regarding a type of reaction associated with a service processor and/or a data storage system. For example, the reaction type data 408 can include information regarding an effect on a service processor and/or a data storage system in response to an event associated with a service processor and/or a data storage system. The priority data 410 can include information regarding priority of an action performed on a data storage system in response to a determination that profile data (e.g., the profile data 300) satisfies a set of defined criteria. The severity data 412 can include information regarding a severity level for an event associated with a service processor and/or a data storage system. The action type data 414 can include information regarding a type of action to perform in response to a determination that profile data (e.g., the profile data 300) satisfies a set of defined criteria.

Figure 5:
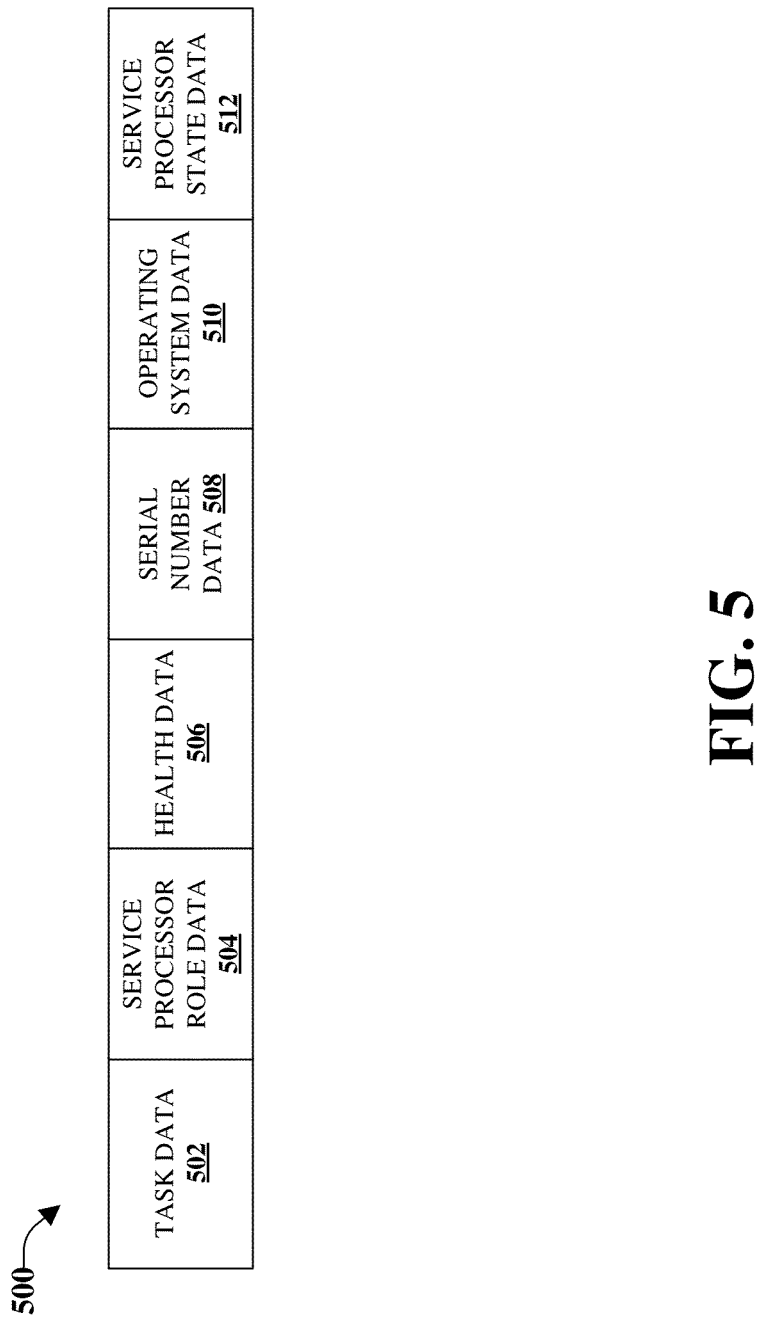
FIG. 5 illustrates example, non-limiting service processor data in accordance with one or more embodiments described herein.

Referring now to FIG. 5, there is illustrated a non-limiting implementation of service processor data 500 in accordance with various aspects and implementations of this disclosure. Repetitive description of like elements employed in other embodiments described herein is omitted for sake of brevity. The service processor data 500 can include information regarding one or more service processors. For example, the service processor data 500 can include information regarding the service processor 112. In another example, the service processor data 500 can include information regarding one or more service processors from the one or more service processors $112_{1-N}$. Additionally, the service processor data 500 can be generated by the monitoring component 104, for example, to facilitate performing one or more actions associated with a data storage system (e.g., the data storage system 114). In an aspect, the service processor data 500 can provide context data indicative of context for trend information associated with a service processor and/or a data storage system. In certain embodiments, the service processor data 500 can be employed in combination with the profile data 300 and/or the detail data 400 to facilitate performing one or more actions associated with a data storage system (e.g., the data storage system 114). In an embodiment, the service processor data 500 can include task data 502, service processor role data 504, health data 506, serial number data 508, operating system data 510, and/or service processor state data 512. The task data 502 can include information regarding one or more tasks performed by a service processor. The service processor role data 504 can include information regarding a role of a service processor with respect to a data storage system. The health data 506 can include information regarding a health status of a service processor. For instance, the health data 506 can provide information regarding performance of one or more components of a service processor. The serial number data 508 can include information regarding a serial number for a service processor. The operating system data 510 can include information regarding an operating system of a service processor. For instance, the operating system data 510 can include information regarding an operating system image executed by a service processor. The service processor state data 512 can include information regarding a state of a service processor. For instance, the service processor state data 512 can include information regarding a processing state, a power state, a memory state, and/or another type of state associated with the service processor.

In certain embodiments, the monitoring component 104 can determine one or more monitor context ratings for the service processor 112 based on the profile data 300, the detail data 400 and/or the service processor state data 512. For example, the interpretation component 106 can perform one or more actions associated with the data storage system 114 based on the profile data 300, the detail data 400 and/or the service processor state data 512. In certain embodiments, the monitoring component 104 can extract, parse and/or chunk data from the profile data 300, the detail data 400 and/or the service processor state data 512 to facilitate performing one or more actions associated with the data storage system 114. In certain embodiments, the monitoring component 104 can calculate a weighting risk value for a service processor (e.g., based on the profile data 300, the detail data 400 and/or the service processor state data 512) to facilitate performing one or more actions associated with the data storage system 114. In certain embodiments, the monitoring component 104 can re-evaluate one or more portions of a service processor in response to a determination that one or more portions of the profile data 300, the detail data 400 and/or the service processor state data 512 satisfy one or more defined criterion. In certain embodiments, the monitoring component 104 can generate an alert in response to a determination that a re-evaluated portion of a service processor satisfies a defined criterion.

Figure 6:
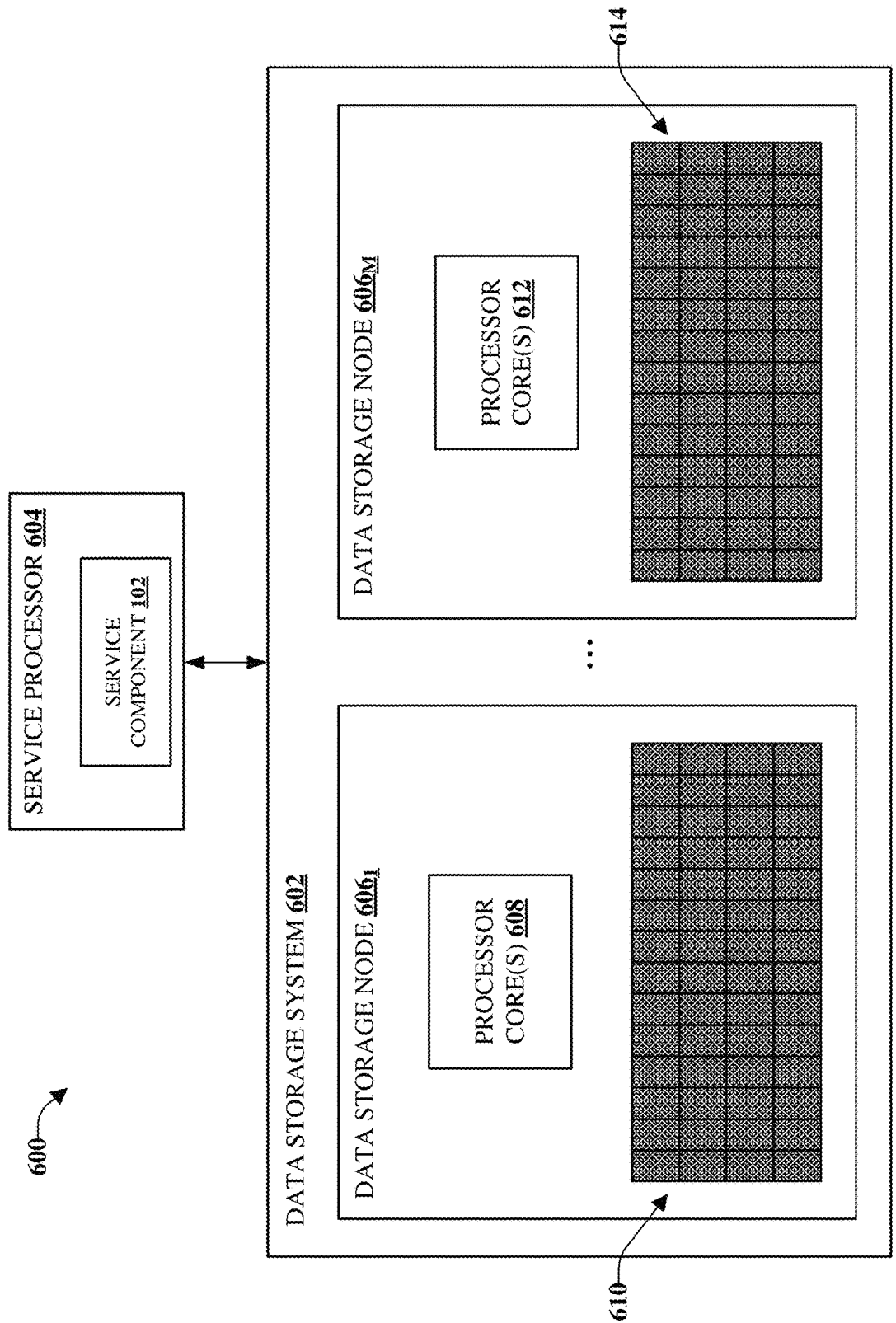
FIG. 6 illustrates yet another example, non-limiting, system for monitoring service processors associated with a data storage system in accordance with one or more embodiments described herein.

Referring now to FIG. 6, there is illustrated a non-limiting implementation of a system 600 in accordance with various aspects and implementations of this disclosure. Repetitive description of like elements employed in other embodiments described herein is omitted for sake of brevity. The system 600 includes a data storage system 602 and a service processor 604. The service processor 604 can include the service component 102. The data storage system 602 can include one or more storage nodes $606_{1-M}$, where M is an integer. In an example, the service processor 604 can correspond to the service processor 112 or a service processor from the one or more service processors $112_{1-N}$. Additionally, the data storage system 602 can correspond to the data storage system 114. The service processor 604 (e.g., the service component 102 of the service processor 604) can be communicatively coupled to the data storage system 602. For instance, the service processor 604 (e.g., the service component 102 of the service processor 604) can be communicatively coupled to the one or more storage nodes $606_{1-M}$. In an aspect, the service processor 604 can control one or more functions for the data storage system 602 (e.g., one or more functions for the one or more storage nodes $606_{1-M}$). Furthermore, in an embodiment, the service component 102 can monitor the service processor 604 and/or the data storage system 602 (e.g., the one or more storage nodes $606_{1-M}$). In certain embodiments, at least one data storage node from the one or more storage nodes $606_{1-M}$ can include the service processor 604.

In an embodiment, the data storage node $606_1$ can include one or more processor cores 608 and a set of storage devices 610. The one or more processor cores 608 can manage storage of data to and/or from the set of storage devices 610. In an aspect, the one or more processor cores 608 can run one or more services to facilitate storage of data to and/or from the set of storage devices 610. For example, in some embodiments, the one or more processor cores 608 can provide an authentication service to authenticate storage requests to the set of storage devices 610, provide an application programming interface to parse and/or interpret requests to the set of storage devices 610, provide a storage chunk management service to facilitate storage chunk allocation for different storage system needs to the set of storage devices 610, monitor storage chunk health and usage associated with the set of storage devices 610, provide a storage server management service to manage available storage devices capacity associated with the set of storage devices 610, track storage device states associated with the set of storage devices 610, provide a storage server service to interface with the set of storage devices 610. The data storage node $606_1$ can be, for example, a server device. In one example, the data storage node $606_1$ can be data service platform to facilitate cloud storage of data. The set of storage devices 610 can be a storage cluster that includes one or more storage devices. For example, the set of storage devices 610 can be a set of hard drives. In one example, the set of storage device 610 can be a flash memory array. However, it is to be appreciated that the set of storage devices 610 can additionally or alternatively include another type of storage device.

Additionally, the data storage node $606_M$ can include one or more processor cores 612 and a set of storage devices 614. The one or more processor cores 612 can manage storage of data to and/or from the set of storage devices 614. In an aspect, the one or more processor cores 612 can run one or more services to facilitate storage of data to and/or from the set of storage devices 614. For example, in some embodiments, the one or more processor cores 612 can provide an authentication service to authenticate storage requests to the set of storage devices 614, provide an application programming interface to parse and/or interpret requests to the set of storage devices 614, provide a storage chunk management service to facilitate storage chunk allocation for different storage system needs to the set of storage devices 614, monitor storage chunk health and usage associated with the set of storage devices 614, provide a storage server management service to manage available storage devices capacity associated with the set of storage devices 614, track storage device states associated with the set of storage devices 614, provide a storage server service to interface with the set of storage devices 614. The data storage node 606$_M$ can be, for example, a server device. In one example, the data storage node 606$_M$ can be data service platform to facilitate cloud storage of data. The set of storage devices 614 can be a storage cluster that includes one or more storage devices. For example, the set of storage devices 614 can be a set of hard drives. In one example, the set of storage device 614 can be a flash memory array. However, it is to be appreciated that the set of storage devices 614 can additionally or alternatively include another type of storage device. The data storage node 606$_1$ can be communicatively coupled to the data storage node 606$_M$. In certain embodiments, the data storage node 606$_1$ can be located at a first geographical location and the data storage node 606$_M$ can be located at a second geographical location. In an embodiment, the data storage system 602 (e.g., the one or more storage nodes 606$_{1-M}$) can be a distributed storage system where the one or more storage nodes 606$_{1-M}$ are one or more clients in communication via a network. The network can include various types of communication networks or combinations thereof including, but not limited to, networks using protocols such as Ethernet, Internet Small Computer System Interface (iSCSI), Fibre Channel (FC), and/or wireless protocols. Furthermore, in certain embodiments, the one or more storage nodes 606$_{1-M}$ can include user applications, application servers, data management tools, and/or testing systems.

As utilized herein an "entity," "client," and/or "user," can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

It should be appreciated that data store components (e.g., memories) and/or storage devices described herein can be either volatile memory, nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
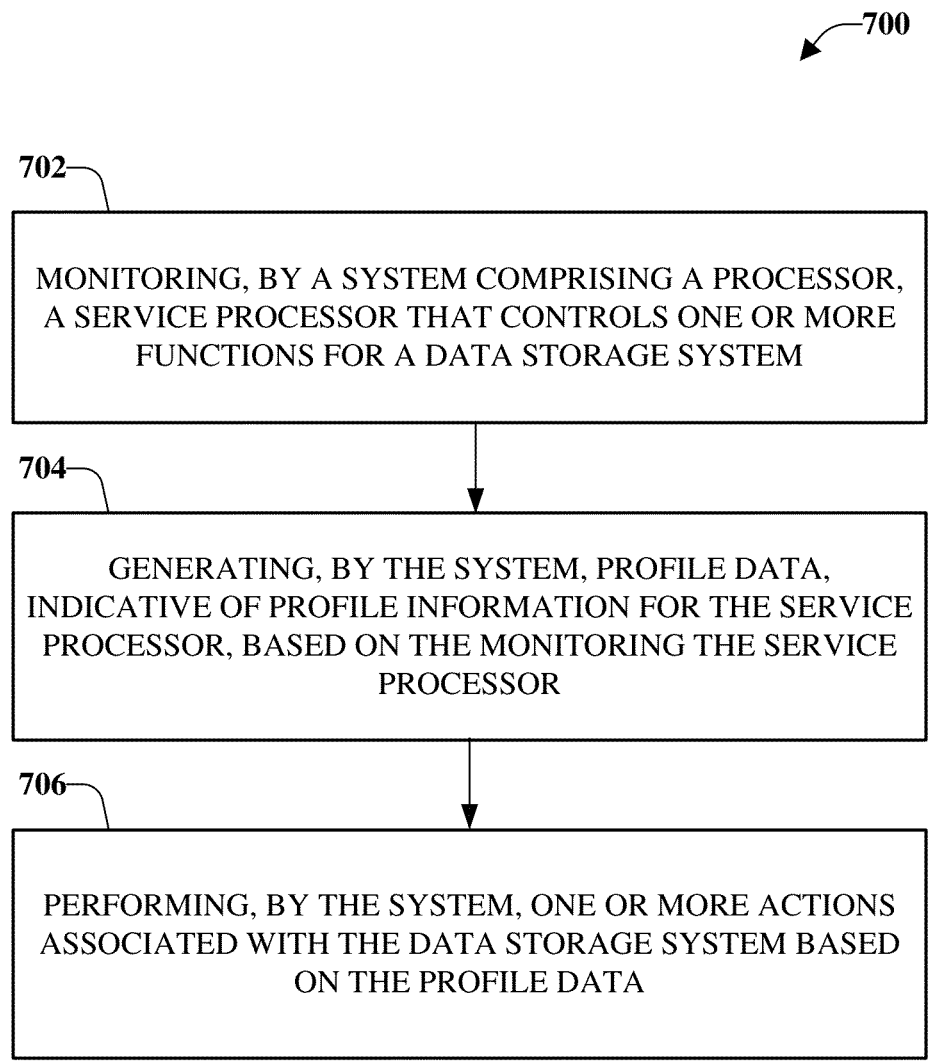
FIG. 7 illustrates a flow diagram of an example, non-limiting, computer-implemented method that facilitates monitoring service processors associated with a data storage system in accordance with one or more embodiments described herein.

FIG. 7 illustrates a flow diagram of an example, non-limiting, computer-implemented method 700 that facilitates monitoring service processors associated with a data storage system in accordance with one or more embodiments described herein. Repetitive description of like elements employed in other embodiments described herein is omitted for sake of brevity. At 702 of the computer-implemented method 700, a service processor that controls one or more functions for a data storage system is monitored by a system comprising a processor (e.g., by monitoring component 104). For example, the service processor can be a processor that manages and/or controls one or more functions, one or more services, one or more processes, and/or one or more activities for a data storage system. In an embodiment, the service processor can remotely monitor, manage and/or modify one or more portions of the data storage system. The data storage system can include hardware and/or software to store data. For instance, the data storage system can include a set of processor cores, a set of memory cores, and/or memory system software to facilitate storage of data. In certain embodiments, the service processor can interact with one or more storage devices of the data storage system. In an example, the data storage system can be a distributed data storage system (e.g., the one or more storage devices can be geographically distributed devices). For example, a first data storage device of the data storage system can be located in a first geographical location and a second data storage device of the data storage system can be located in a second geographical location. Furthermore, in an embodiment, the data storage system can include an array of flash memory to facilitate storage of data.

At 704 of the computer-implemented method 700, profile data, indicative of profile information for the service processor, is generated, by the system (e.g., by monitoring component 104), based on the monitoring the service processor. In an embodiment, the profile data can include trend data indicative of trend information for the service processor. For instance, the profile data can include information regarding one or more trends associated with the service processor, one or more events associated with the service processor, and/or one or more monitored conditions associated with the service processor. In an embodiment, security mechanism data indicative of one or more security mechanism files located in the data storage system can be monitored. Furthermore, the profile data can be generated based on the security mechanism data. In certain embodiments, the profile data can include information such as, but not limited to, information related to security mechanism files located in the data storage system, information related to a health of the service processor, information related to one or more applications executed by the service processor, information related to a state of a process associated with the service processor, and/or other information related to the service processor. Additionally or alternatively, in certain embodiments, the profile data can include log data indicative of log information for monitored event contexts associated with the service processor. The log data can include, for example, event logs, statistics and/or metrics associated with the service processor.

At 706 of the computer-implemented method 700, one or more actions associated with the data storage system is performed, by the system (e.g., by interpretation component 106), based on the profile data. The one or more actions associated with the data storage system can be one or more actions to modify one or more portions of the data storage system. The one or more actions associated with the data storage system can also be performed to mitigate a security threat for the data storage system. A security threat for the data storage system can be a security intrusion attempt related to the data storage system, a viral event related to the data storage system, an unapproved executable event related to the data storage system, and/or another security threat related to the data storage system.

In certain embodiments, the computer-implemented method 700 can additionally or alternatively include performing, by the system (e.g., by monitoring component 104), a hash check associated with one or more security mechanism files located in the data storage system. The profile data can be generated based on the hash check. In certain embodiments, the computer-implemented method 700 can additionally or alternatively include monitoring (e.g., by monitoring component 104), by the system, network traffic received by the data storage system. The profile data can be generated based on the network traffic received by the data storage system. In certain embodiments, the computer-implemented method 700 can additionally or alternatively include monitoring, by the system (e.g., by monitoring component 104), a status of one or more applications associated with the service processor.

Figure 8:
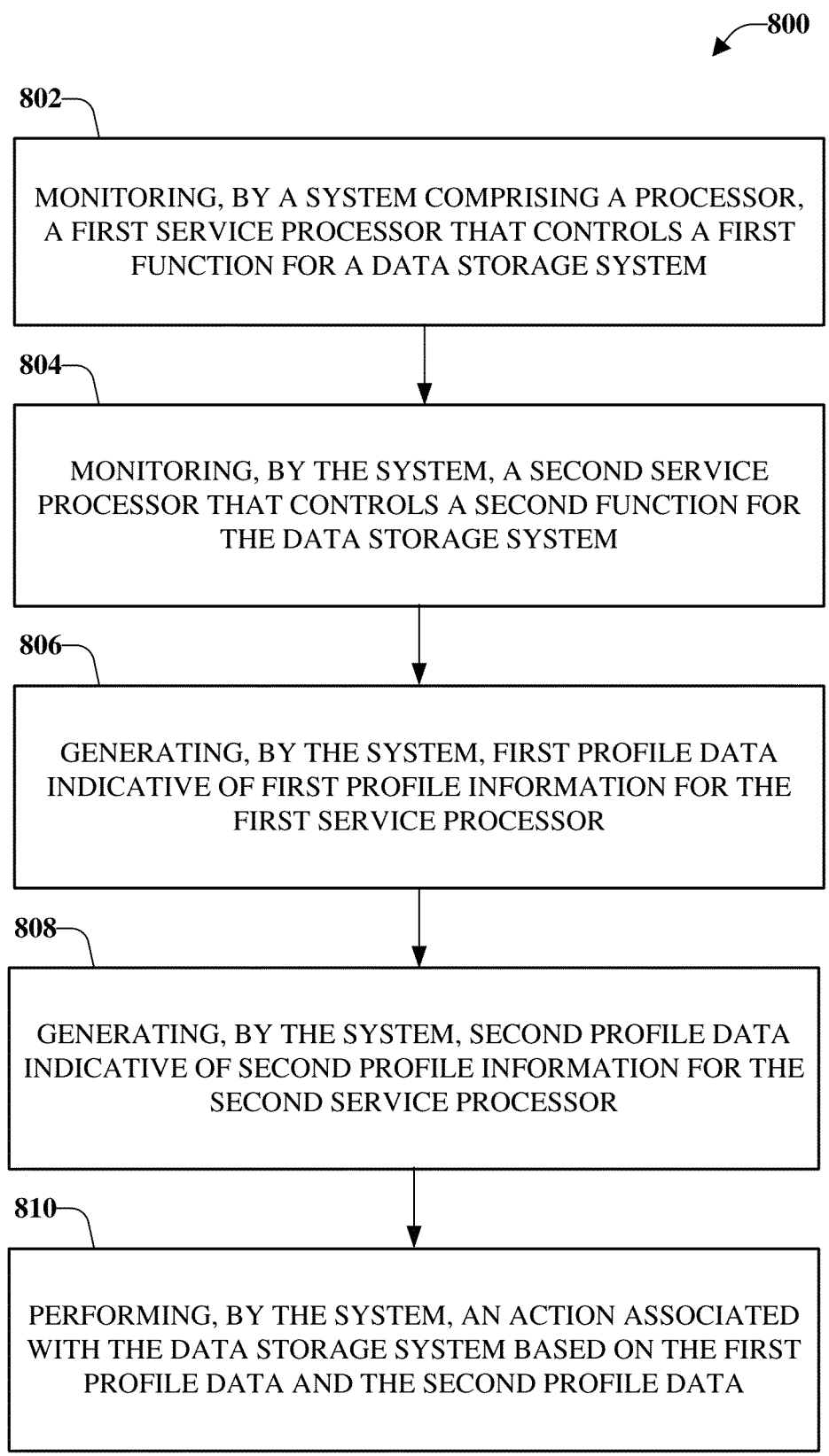
FIG. 8 illustrates a flow diagram of another example, non-limiting, computer-implemented method that facilitates monitoring service processors associated with a data storage system in accordance with one or more embodiments described herein.

FIG. 8 illustrates a flow diagram of an example, non-limiting, computer-implemented method 800 that facilitates monitoring service processors associated with a data storage system in accordance with one or more embodiments described herein. Repetitive description of like elements employed in other embodiments described herein is omitted for sake of brevity. At 802 of the computer-implemented method 800, a first service processor that controls a first function for a data storage system is monitored by a system comprising a processor (e.g., by monitoring component 104). For example, the first service processor can be a first processor that manages and/or controls one or more first functions, one or more first services, one or more first processes, and/or one or more first activities for a data storage system. In an embodiment, the first service processor can remotely monitor, manage and/or modify one or more first portions of the data storage system. The data storage system can include hardware and/or software to store data. For instance, the data storage system can include a set of processor cores, a set of memory cores, and/or memory system software to facilitate storage of data. In certain embodiments, the first service processor can interact with one or more storage devices of the data storage system. In an example, the data storage system can be a distributed data storage system (e.g., the one or more storage devices can be geographically distributed devices). For example, a first data storage device of the data storage system can be located in a first geographical location and a second data storage device of the data storage system can be located in a second geographical location. Furthermore, in an embodiment, the data storage system can include an array of flash memory to facilitate storage of data.

At 804 of the computer-implemented method 800, a second service processor that controls a second function for the data storage system is monitored by the system (e.g., by monitoring component 104). For example, the second service processor can be a second processor that manages and/or controls one or more second functions, one or more second services, one or more second processes, and/or one or more second activities for the data storage system. In an embodiment, the second service processor can remotely monitor, manage and/or modify one or more second portions of the data storage system. In certain embodiments, the second service processor can interact with one or more storage devices of the data storage system.

At 806 of the computer-implemented method 800, first profile data indicative of first profile information for the first service processor is generated (e.g., by monitoring component 104). For instance, the first profile data can include information regarding one or more trends associated with the first service processor, one or more events associated with the first service processor, and/or one or more monitored conditions associated with the first service processor. In an embodiment, security mechanism data indicative of one or more security mechanism files located in the data storage system can be monitored. Furthermore, the first profile data can be generated based on the security mechanism data. In certain embodiments, the first profile data can include information such as, but not limited to, information related to security mechanism files located in the data storage system, information related to a health of the first service processor, information related to one or more applications executed by the first service processor, information related to a state of a process associated with the first service processor, and/or other information related to the first service processor. Additionally or alternatively, in certain embodiments, the first profile data can include first log data indicative of first log information for monitored event contexts associated with the first service processor. The first log data can include, for example, event logs, statistics and/or metrics associated with the first service processor.

At 808 of the computer-implemented method 800, second profile data indicative of second profile information for the second service processor is generated (e.g., by monitoring component 104). For instance, the second profile data can include information regarding one or more trends associated with the second service processor, one or more events associated with the second service processor, and/or one or more monitored conditions associated with the second service processor. In an embodiment, security mechanism data indicative of one or more security mechanism files located in the data storage system can be monitored. Furthermore, the second profile data can be generated based on the security mechanism data. In certain embodiments, the second profile data can include information such as, but not limited to, information related to security mechanism files located in the data storage system, information related to a health of the second service processor, information related to one or more applications executed by the second service processor, information related to a state of a process associated with the second service processor, and/or other information related to the second service processor. Additionally or alternatively, in certain embodiments, the second profile data can include second log data indicative of second log information for monitored event contexts associated with the second service processor. The second log data can include, for example, event logs, statistics and/or metrics associated with the second service processor.

At 810 of the computer-implemented method 800, an action associated with the data storage system is performed, by the system (e.g., by interpretation component 106), based on the first profile data and the second profile data. The action associated with the data storage system can be one or more actions to modify one or more portions of the data storage system. The action associated with the data storage system can also be performed to mitigate a security threat for the data storage system. A security threat for the data storage system can be a security intrusion attempt related to the data storage system, a viral event related to the data storage system, an unapproved executable event related to the data storage system, and/or another security threat related to the data storage system.

Figure 9:
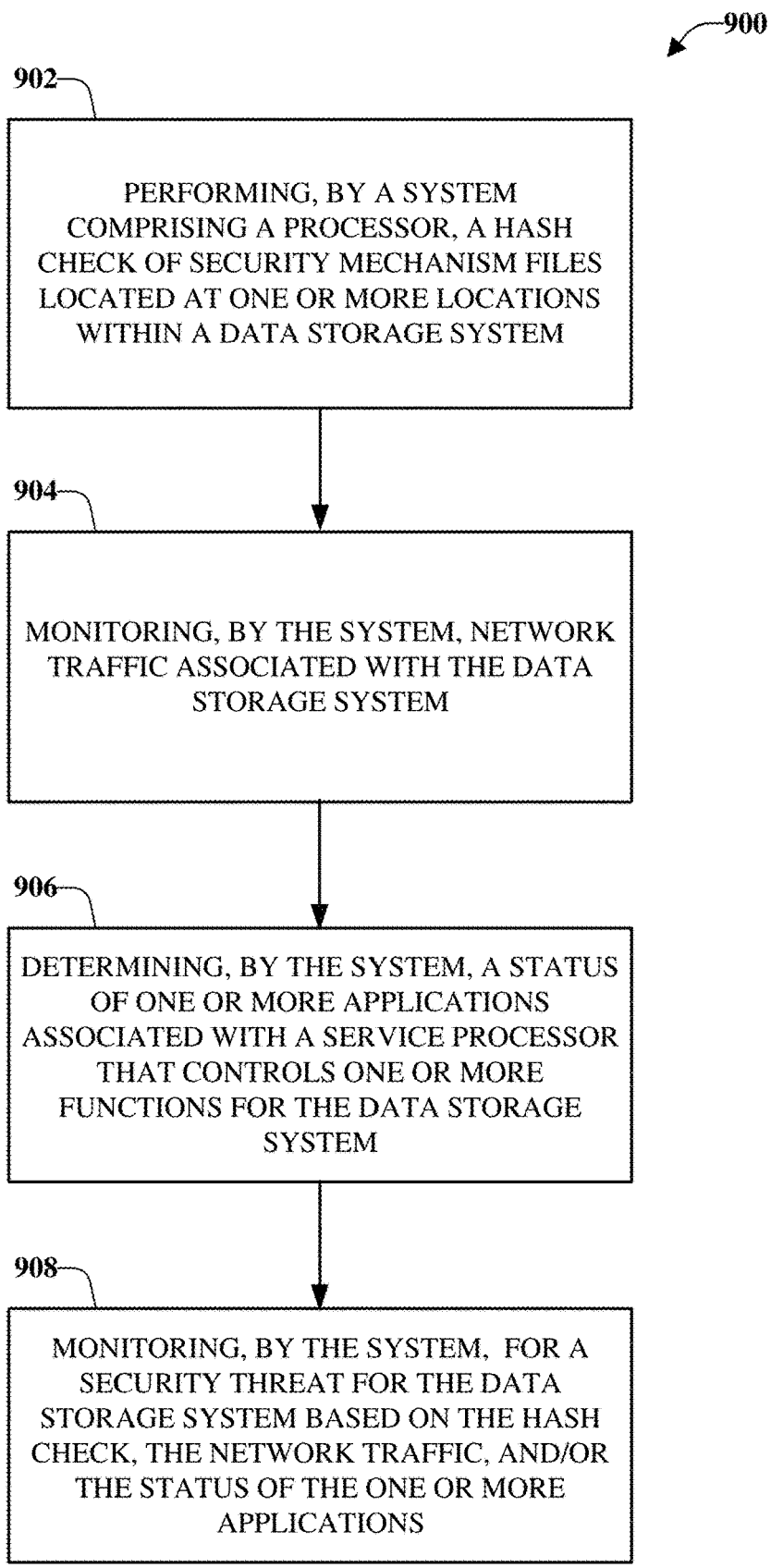
FIG. 9 illustrates a flow diagram of yet another example, non-limiting, computer-implemented method that facilitates monitoring service processors associated with a data storage system in accordance with one or more embodiments described herein.

FIG. 9 illustrates a flow diagram of an example, non-limiting, computer-implemented method 900 that facilitates monitoring service processors associated with a data storage system in accordance with one or more embodiments described herein. Repetitive description of like elements employed in other embodiments described herein is omitted for sake of brevity. At 902 of the computer-implemented method 900, a hash check of security mechanism files located at one or more locations within a data storage system is performed by a system comprising a processor (e.g., by monitoring component 104). At 904 of the computer-implemented method 900, network traffic associated with the data storage system is monitored (e.g., by monitoring component 104). At 906 of the computer-implemented method 900, a status of one or more applications associated with a service processor that controls one or more functions for the data storage system is determined by the system (e.g., by monitoring component 104). At 908 of the computer-implemented method 900, monitoring for a security threat for the data storage system is performed, by the system (e.g., by monitoring component 104), based on the hash check, the network traffic, and/or the status of the one or more applications. In certain embodiments, one or more actions associated with the data storage system can be performed based on the hash check, the network traffic, and/or the status of the one or more applications. The one or more actions associated with the data storage system can also be performed to mitigate a security threat for the data storage system. A security threat for the data storage system can be a security intrusion attempt related to the data storage system, a viral event related to the data storage system, an unapproved executable event related to the data storage system, and/or another security threat related to the data storage system.

Figure 10:
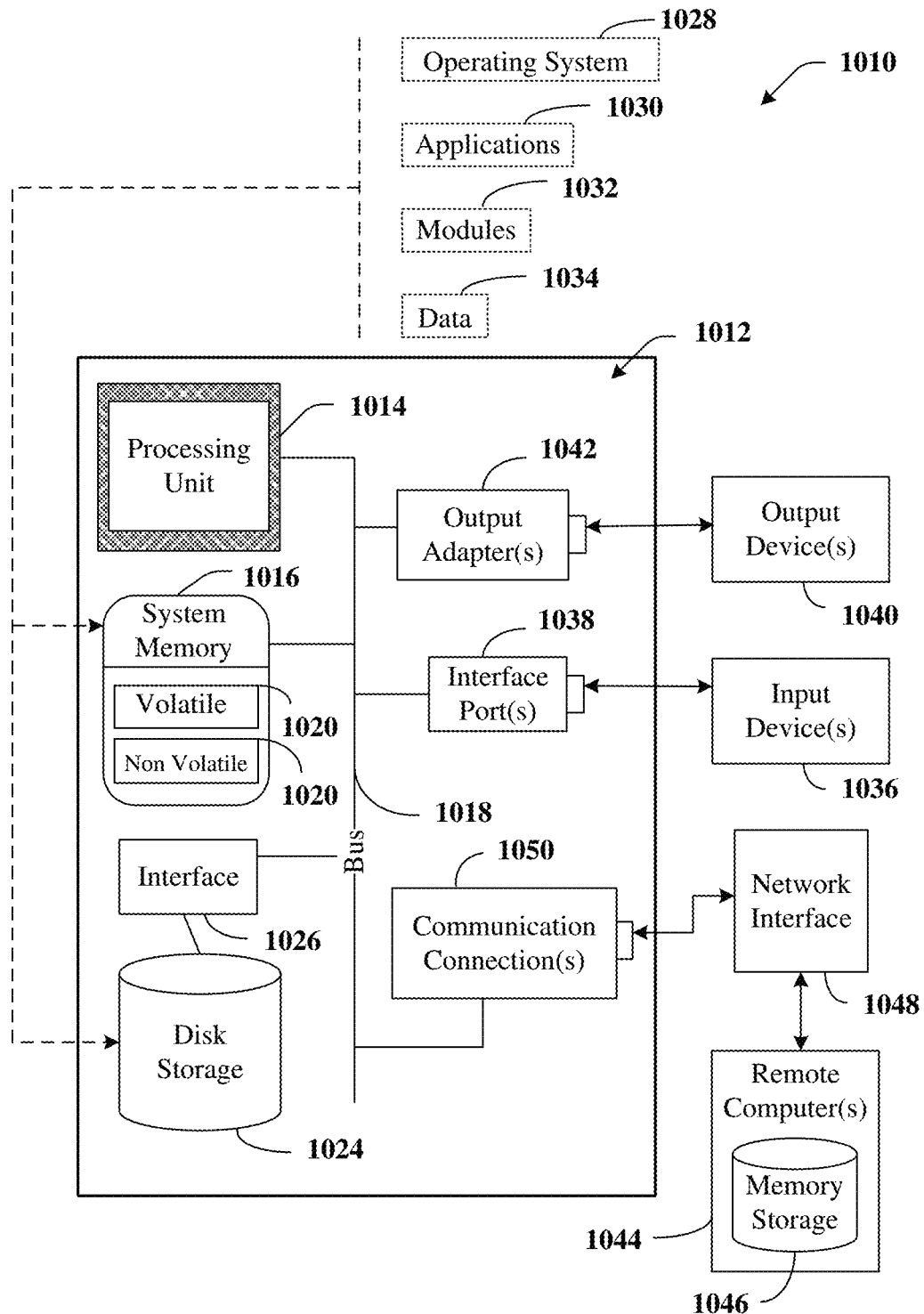
FIG. 10 illustrates an example, non-limiting, computing environment in which one or more embodiments described herein can be facilitated.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

Figure 11:
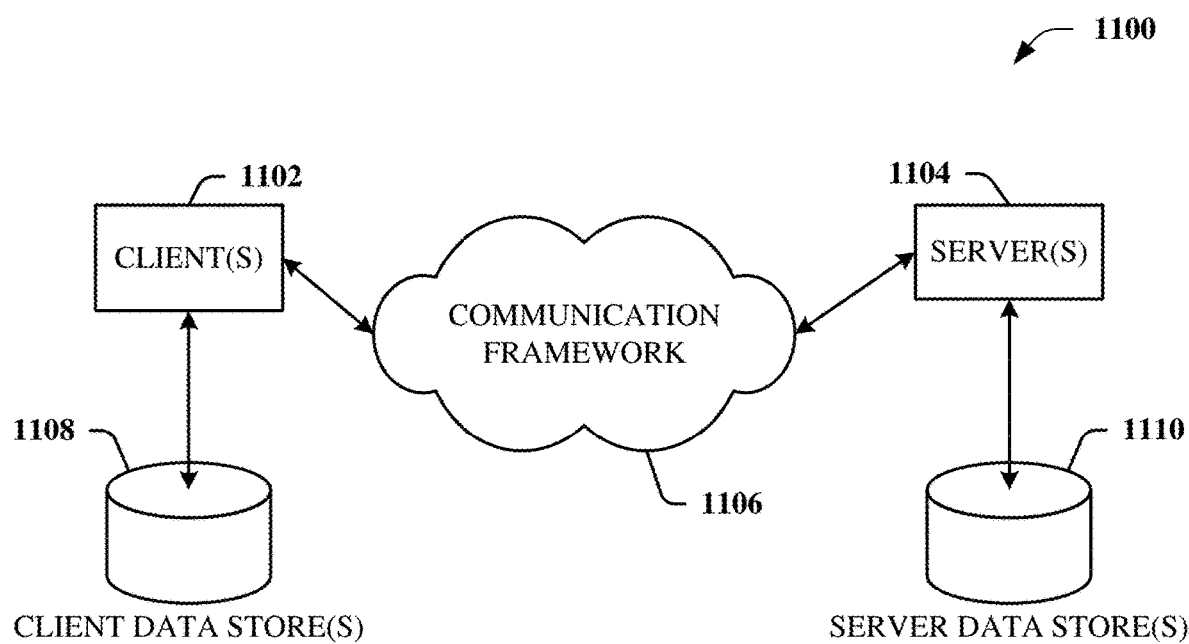
FIG. 11 illustrates an example, non-limiting, networking environment in which one or more embodiments described herein can be facilitated.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a non-transitory memory that stores computer executable components; and
    a processor that executes the computer executable components stored in the non-transitory memory to perform operations, comprising:
        monitoring a security mechanism of a service processor that controls one or more functions for a data storage system and generates trend data indicative of security mechanism trend information for the service processor; and
        performing one or more actions associated with the data storage system in response to a determination that the trend data satisfies a set of defined criteria associated with monitored conditions for the data storage system.

2. The system of claim 1, wherein the operations further comprise: monitoring a health state of the service processor, and wherein the trend data is further indicative of health trend information for the service process.

3. The system of claim 1, wherein the operations further comprise: generating log data indicative of log information for monitored event contexts associated with the service processor, and wherein the performing comprises performing the one or more actions associated with the data storage system based on the trend data and the log data.

4. The system of claim 1, wherein the service processor is a first service processor, wherein the trend data is first trend data, and wherein the operations further comprise: monitoring a second service processor associated with the data storage system and generating second trend data indicative of different trend information for the second service processor or one or more other in-network processors.

5. The system of claim 4, wherein the performing comprises performing the one or more actions associated with the data storage system based on the first trend data associated with the first service processor and the second trend data associated with the second service processor or one or more other service processors.

6. The system of claim 1, wherein the monitoring comprises monitoring security mechanism data indicative of one or more security mechanism files associated with the data storage system and generating the trend data based on the security mechanism data.

7. A method, comprising:
monitoring, by a system comprising a processor, a security mechanism of a service processor that controls one or more functions for a data storage system;
generating, by the system, profile data, indicative of profile information for the service processor, wherein the profile data comprises trend data indicative of a security efficacy trend associated with the security mechanism that is generated based on the monitoring the security mechanism; and
performing, by the system, one or more actions associated with the data storage system based on the profile data.

8. The method of claim 7, wherein the generating the profile data comprises generating trend data indicative of trend information for the service processor.

9. The method of claim 7, further comprising:
performing, by the system, a hash check associated with one or more security mechanism files located in the data storage system.

10. The method of claim 9, wherein the generating the profile data comprises comprise generating the profile data based on the hash check.

11. The method of claim 7, further comprising:
monitoring, by the system, network traffic received by the data storage system.

12. The method of claim 11, wherein the generating the profile data comprises generating the profile data based on the network traffic received by the data storage system.

13. The method of claim 7, further comprising:
monitoring, by the system, a status of one or more applications associated with the service processor.

14. The method of claim 7, wherein the service processor is a first service processor, wherein the profile data is first profile data, and wherein the method further comprises:
monitoring, by the system, a second service processor that controls one or more other functions for the data storage system; and
generating, by the system, second profile data indicative of different profile information for a second profile processor.

15. The method of claim 14, wherein the performing the one or more actions comprises performing the one or more actions based on the first profile data for the first service processor and the second profile data for the second service processor.

16. A non-transitory computer-readable medium comprising instructions that, in response to execution, cause a system comprising a processor to perform operations, comprising:
monitoring a first security mechanism of a first service processor that controls a first function for a data storage system;
monitoring a second service processor that controls a second function for the data storage system;
generating first profile data indicative of first profile information for the first service processor, wherein the first profile data comprises first trend data indicative of a first security efficacy trend that is generated in response to the monitoring the first security mechanism;
generating second profile data indicative of second profile information for the second service processor; and
performing an action associated with the data storage system based on the first profile data and the second profile data.

17. The non-transitory computer-readable medium of claim 16, wherein the operations further comprise:
performing a hash check associated with a security mechanism file located in the data storage system.

18. The non-transitory computer-readable medium of claim 17, wherein the generating the first profile data comprises generating the first profile data based on the hash check.

19. The non-transitory computer-readable medium of claim 17, wherein the generating the second profile data comprises generating the second profile data based on the hash check.

20. The non-transitory computer-readable medium of claim 17, wherein the performing the hash check comprises performing a message-digest algorithm or a secure hash algorithm.

* * * * *